United States Patent [19]

Dunn et al.

[11] 4,198,871
[45] Apr. 22, 1980

[54] TRANSDUCER POSITIONING APPARATUS

[75] Inventors: David S. Dunn, Windham; R. Bruce Gifford, Nashua, both of N.H.; Edward F. Burke, Jr., Reading, Mass.

[73] Assignee: MFE Corporation, Salem, N.H.

[21] Appl. No.: 881,749

[22] Filed: Feb. 27, 1978

[51] Int. Cl.² ............................................. F16H 19/06
[52] U.S. Cl. ............................................. 74/37; 74/89.2
[58] Field of Search ............... 74/89.2, 242.1 R, 216.5; 346/139 A; 358/293

[56] References Cited

U.S. PATENT DOCUMENTS

| 2,884,486 | 4/1959 | Wise | 358/293 |
|---|---|---|---|
| 3,273,408 | 9/1966 | Nagel et al. | 74/37 |
| 3,500,363 | 3/1970 | Shill | 360/97 |
| 3,749,828 | 7/1973 | Knothe et al. | 179/100.4 C |
| 3,777,577 | 12/1973 | Giacomello et al. | 74/89.22 |
| 3,946,439 | 3/1976 | Castrodale | 360/105 |

FOREIGN PATENT DOCUMENTS

912328 12/1962 United Kingdom ..................... 74/37

Primary Examiner—C. J. Husar
Assistant Examiner—Conrad Berman
Attorney, Agent, or Firm—Cesari and McKenna

[57] ABSTRACT

Apparatus for moving a transducer carriage intermittently along a tract relative to a recording medium employs belting arranged in a closed loop that is tensioned by engagement around at least one idler and connected to the carriage. Belt end segments comprising the loop are wrapped in opposite directions around the periphery of a stepping motor-driven capstan and their ends are secured thereto at axially spaced apart locations thereon. The belting and idlers are arranged so that all of the belt segments wrapped around the capstan remain parallel to the carriage track as the capstan rotates so as to advance the carriage a maximum number of increments along its track.

11 Claims, 3 Drawing Figures

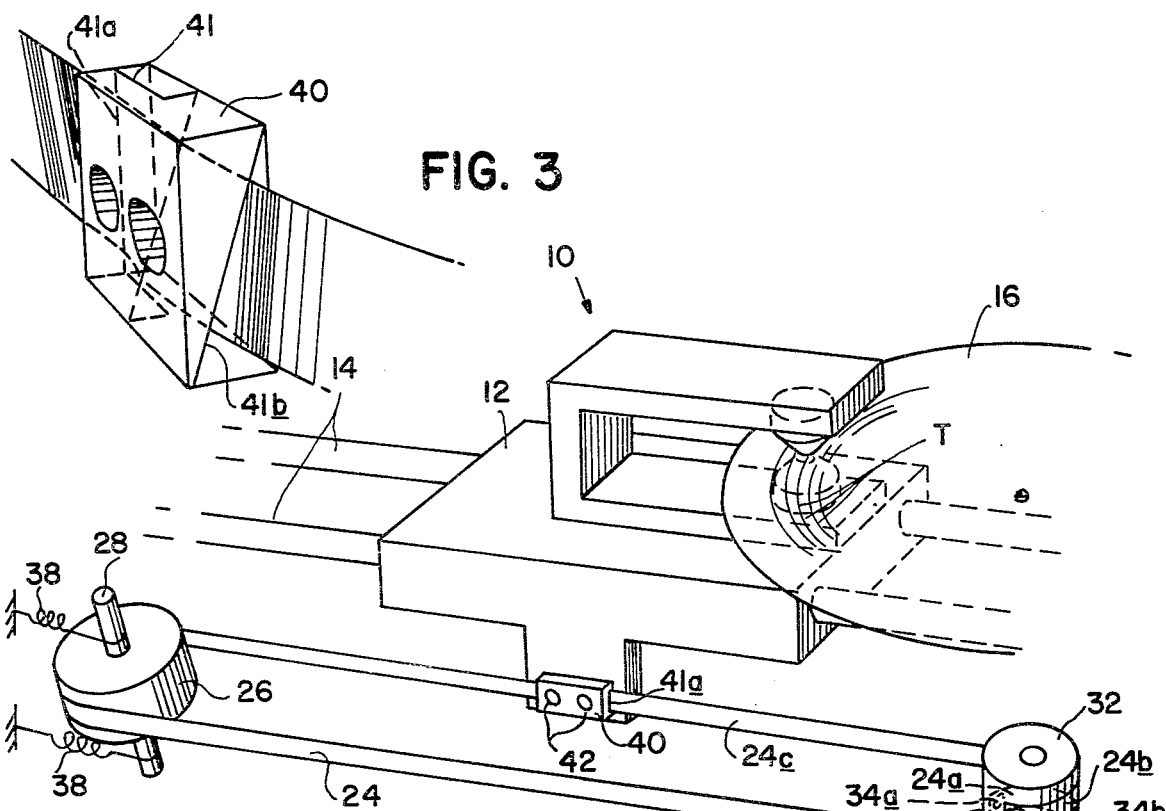
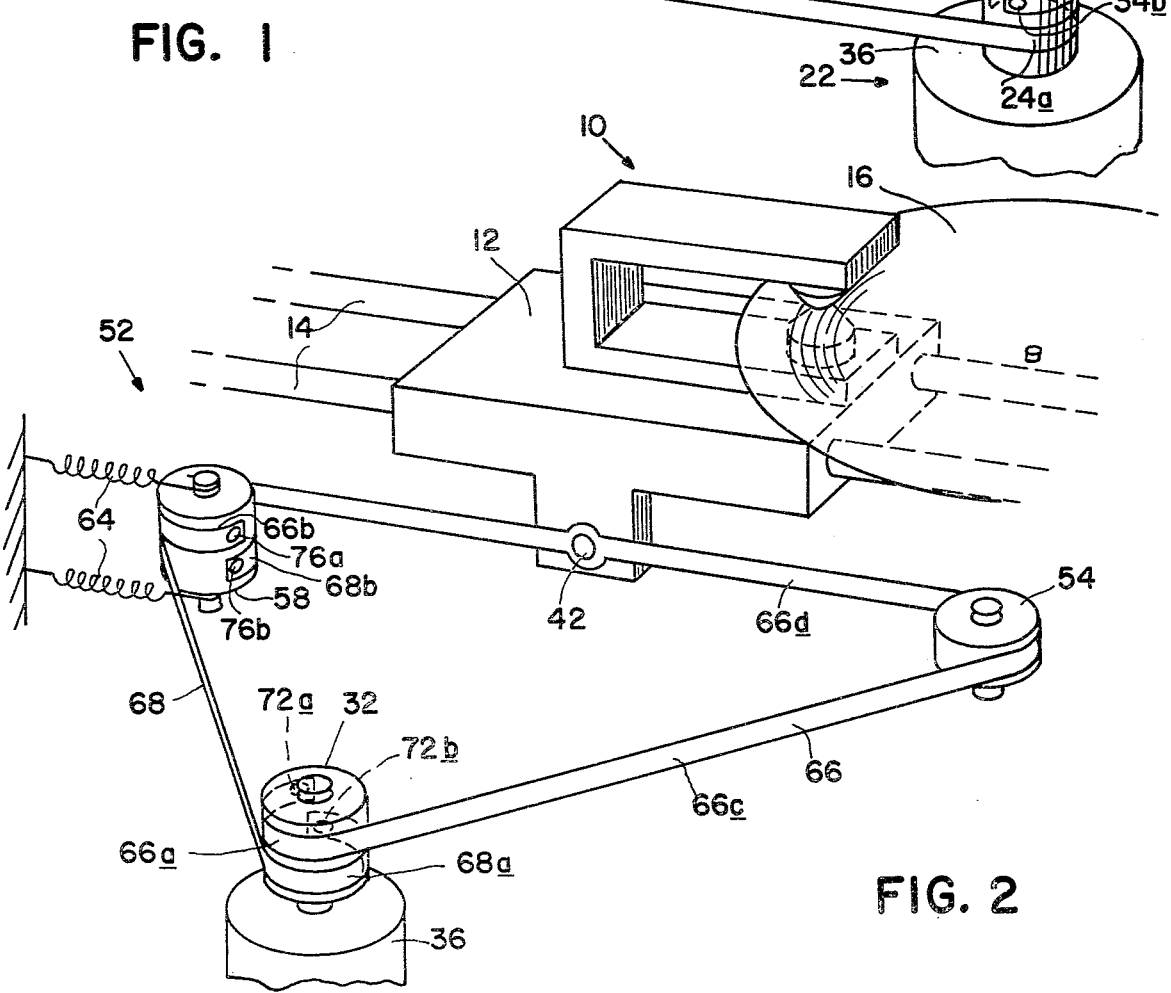

TRANSDUCER POSITIONING APPARATUS

BACKGROUND OF THE INVENTION

This invention relates to apparatus for positioning a transducer relative to a recording medium. It relates more specifically to an intermittent feedng device that moves a transducer between the tracks of a rotary recording medium such as a magnetic disk.

There are numerous different types of transducer positioning devices. The general type with which we are concerned here moves the transducer by means of a belt loop that is advanced in one direction or the other by a stepping motor-driven capstan engaged in the loop. Examples of such belt-driven positioning devices are contained in U.S. Pat. Nos. 3,749,828 and 3,946,439.

In general, these conventional devices employ an endless belt loop that is stretched between a capstan and a tensioned idler. A carriage supporting the transducer is connected to the belt at a location between the capstan and idler so that when the belt is moved in one direction or another, the carriage is moved one way or the other along a fixed track relative to the recording medium. Of course, the belt cannot be permitted to wind up on the capstan so that belt segments overlap because this would change the effective radius of the capstan. Then, for each angular increment of the capstan, the transducer would be moved a distance that would vary depending upon the amount of wrap on the capstan. Such would result in uneven spacing between the tracks on the recording medium which is the reason why a single belt loop is generally used in positioning devices of this type. The belt is advanced in increments by means of a stepping motor which, when pulsed, rotates the capstan through very small angular distances or steps. Typically the motor shaft may have as many as 200 steps per revolution.

Also in devices of this type, the belt is invariably secured at a point on the periphery of the capstan to prevent relative movement between the belt and the capstan in order to insure that each step of the stepping motor advances the transducer precisely the same distance along its track. Because of this connection, neither the shaft of the stepping motor nor the capstan can be rotated in either direction through one revolution. For as the capstan rotates, different incremental belt lengths leave the capstan at one side thereof, while others arrive at the capstan at the opposite side thereof. Most often the connection point between the belt and the capstan is located at the end of the loop when the transducer carriage is situated midway between the capstan and the idler. This permits the capstan to be rotated in either direction through an angle that is theoretically 90 degrees before the connection point to the capstan is rotated around to where the belt departs from the capstan.

In actual practice, however, the angle is much less, being only on the order of 75 degrees because of stresses developed in the tape as the connection point approaches the departure point. In other words, the total angular excursion of the capstan is only about 150 degrees. This means that a 200 step per revolution stepping motor can rotate the capstan through 150 degrees or 77 steps. Therefore, the transducer can only be incremented 77 steps radially across the recording medium. Since each of these steps defines a track on the recording medium, this severely limits the track density on the medium.

It is possible to operate some stepping motors in a half-step mode thereby doubling the track density, not, however, without paying a penalty in terms of performance and transducer positional accuracy. Also in some cases because of the small increments involved, a relatively large diameter capstan is required which has appreciable inertia. Therefore the response of such a device is rather slow so that a relatively long time is required to move the transducer between tracks on the associated recording medium.

SUMMARY OF THE INVENTION

Accordingly it is the object of the present invention to provide apparatus for positioning a transducer relative to a recording medium that permits the recording medium to have a high track density.

Another object is to provide an intermittent positioning device for advancing a transducer which is capable of intermittently feeding a transducer across a recording medium to form tracks that are equally spaced on the medium so that very accurate tracking of the transducer can be obtained.

Yet another object of the invention is to provide apparatus for intermittently positioning a transducer on a recording medium employing a conventional stepping motor that permits a maximum number of steps of the stepping motor to be used to position the transducer at different radial locations on the medium.

A further object is to provide apparatus of this general type having a relatively fast response.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly in accordance with our invention, a transducer is positioned on a carriage that is movable along a straight track disposed relative to a recording medium, such as a rotary disk, so that as the carriage moves along its track, the transducer moves radially across the recording medium. As is done conventionally, the carriage is moved in one direction or the other along its track by a capstan-driven belt loop. The loop is stretched between the capstan and one or more idlers with the belt connection to the carriage being located midway along a stretch of belting between the capstan and an idler or between idlers. The capstan is driven intermittently by a stepping motor whose shaft can be stepped through many (e.g. 200) angular increments per revolution.

In accordance with our invention, the belt loop that drives the carriage is formed with the carriage in its midway or reference position by wrapping ends of belting segments in opposite directions approximately 180 degrees around the capstan at points thereon spaced axially along the capstan so that the two ends do not overlap. Each such end is secured to the periphery of the capstan and the belting segments are trained around one or more idlers to better define and to tension the loop.

The idler or idlers are arranged and adapted to maintain the belt loop stretch containing the connection to the transducer carriage parallel to the carriage track. These parts also maintain the belt end segments wrapped around the capstan parallel to one another so that they do not interfere or overlap as the capstan is rotated.

In one embodiment of the invention, a single length of belting is employed to form a loop with two stretches, one of which extends parallel to the carriage track. A single tensioned idler is used whose axis is cocked or skewed relative to the capstan axis to compensate for the axial displacement of the belt end segments engaged around the capstan. Resultantly, when the capstan is rotated, the end segments engaged around, and approaching and departing from, the capstan remain substantially parallel to one another, as well as to the carriage track.

A second embodiment employs two separate lengths of belting that forms a loop with three stretches extending between the capstan and two idlers arranged in a triangle one leg of which extends parallel to the carriage track. One belt length having one end secured to the capstan is trained around a fixed idler and its other end is wrapped around a tensioned idler and secured thereto. The other belt length extends from the capstan directly to the tensioned idler where it is wrapped around the secured thereto.

The placement and amount of wrap of the belt lengths engaged around the tensioned idler is substantially the same as on the capstan. In other words, the ends of those two lengths are spaced apart axially, and are wrapped in opposite directions approximately 180 degrees around the idler so that when the capstan is rotated in either direction from reference position, the tensioned idler is free to rotate through that same angle.

Using either of these arrangements, a conventional capstan in our transducer positioning apparatus is able to be rotated theoretically in either direction from the reference position through an angle of 180 degrees before a belt connection to the capstan reaches a point of departure from the capstan. As a practical matter, however, this excursion is limited to about 135 degrees from the reference position. This means, then, that if the capstan is driven by a 200 step per revolution stepping motor, this achievable angular excursion of 135 degrees corresponds to 154 steps which is twice that obtainable with conventional positioning systems of this general type. Accordingly, the present apparatus essentially doubles the number of tracks that can be recorded on a recording disk by a transducer positioned by this apparatus. Moreover, it accomplishes this feat without having to resort to a large diameter capstan or to half-stepping the stepping motor which lowers the response time of the apparatus and lowers its positional accuracy and overall performance. Yet these advantages are obtained without any appreciable increase in the cost of the apparatus as compared with prior comparable apparatus of this general type.

BRIEF DESCRIPTION OF THE DRAWING

For a fuller understanding of the nature and objects of the invention, reference should be had to the following detailed description taken in connection with the accompanying drawing in which:

FIG. 1 is a diagrammatic view of a transducer positioning apparatus embodying the principles of our invention, FIG. 2 is a similar view of another embodiment thereof, and FIG. 3 is an enlarged fragmentary perspective view of a portion of the FIG. 1 apparatus.

DESCRIPTION OF THE PREFERRED EMBODIMENTS

Referring to FIG. 1 of the drawing, a magnetic read/write transducer, shown generally at 10, is mounted on a carriage 12 that is movable along a straight track defined by a pair of spaced apart parallel guide rods 14. The carriage 12 is movable along the guide rods 14 radially relative to a rotatable magnetic disk 16. The disk is of the usual construction being coated on both sides with a magnetic material.

Carriage 12 is moved in one direction or the other along guide rods 14 by a positioning apparatus indicated generally at 22. The positioning apparatus comprises a flexible belt 24 made of steel or other comparable flexible, inextensible material. The belt 24 extends around an idler 26 rotatably mounted on an axle 28. the opposite end segments 24a and 24b of belt 24 are wrapped in opposite directions about a capstan 32 with the segments 24a and 24b being spaced from one another along the axis of the capstan. The ends of these segments are anchored to the capstan periphery by suitable means such as pins 34a and 34b extending through the segments and radially into the capstan on diametrically opposite sides thereof. Capstan 32 is rotated incrementally by a suitable motor 36 which is preferably of the electrical stepping type having a large number of angular increments or steps per revolution, e.g. 200.

The idler 26 is biased away from capstan 32 by a pair of springs 38 connected to the opposite ends of axle 28 to maintain the belt 24 in the form of a tensioned loop. With the capstan 32 angularly oriented as illustrated in FIG. 1, the carriage 12 is connected to a fixture 40 anchored to the belt midway along the belt stretch 24c between capstan 32 and idler 26 by screws 42.

As seen in FIG. 1, the idler 26 and capstan 32 are arranged so that the belt stretch 24c lies parallel to guide rods 14. Moreover, the idler axle 28 is canted or skewed into the plane of the drawing relative to the axis of the capstan so that the belt segments 24a and 24b that are wrapped about the capstan lie parallel to one another and to the guide rods 14. In other words, the canted idler 26 compensates for the fact that the belt end segments 24a and 24b are displaced axially along the capstan. In a typical embodiment of the apparatus, the idler axle 28 is canted approximately 15 degrees relative to the axis of the capstan.

Referring for a moment to FIG. 3, fixture 40 is slotted lengthwise at 41 to receive belt 24. Furthermore, the slot 41 is shaped with a lengthwise twist to impart a twist to the belt from right to left as viewed in FIG. 1 (left to right in FIG. 3) that corresponds to the skew of idler 26. Thus, in FIG. 1, the right hand slot end 41a nearest the belt end segment 24b is substantially vertical, while the left hand end 41b of the slot is more or less diagonal as viewed from the left end of fixture 40. The belt 26 is anchored in slot 41 by a suitable cement such as epoxy resin and suitable openings are provided in the belt to accommodate screws 42.

With this arrangement, the relatively short belt segment between fixture 40 and the capstan is vertical and has no twist. The belt segment extending from the slot left end 41b around idler 26 to capstan 32 is twisted somewhat. However, that segment is quite long so that the slight twist produces little or no stress on the belt. Of course, the short belt segment in slot 41 is relatively sharply twisted. However, that segment is completely captured by the fixture so that it is not strained.

In use, motor 36 can be stepped in either direction from the reference position illustrated in FIG. 1 at which transducer 10 is located midway along the effective radius of disk 16. If the motor steps in one direction, the capstan 32 can be rotated incrementally clockwise approximately 135 degrees before the belt segment 24b unwraps from the capstan to the extent that its screw connection 34b approaches the point of departure of the belt segment 24b from the capstan. This corresponds to approximately 77 steps of the stepping motor. Thus transducer 10 can be incremented to the right or radially inward on the disk from its illustrated reference position approximately 77 steps thereby positioning the transducer 10 opposite 77 different tracks T on the disk 16.

By the same token, the stepping motor 36 can be stepped in the opposite direction to rotate capstan 32 incrementally counterclockwise approximately 77 steps from its illustrated position thereby moving transducer 10 radially outward on the disk so that it resides opposite 77 additional tracks T on the disk 16. Thus, the illustrated positioning apparatus can move the transducer 10 between a total of 154 different tracks T on the disk 16 which is twice the track density obtainable with prior comparable belt loop type positioning devices that are operated in a full step mode.

Turn now to FIG. 2 which shows another embodiment of our positioning apparatus which is not quite as advantageous as the FIG. 1 embodiment because it requires more belting and another idler. Many of the components in this embodiment are the same as the ones shown in the FIG. 1 apparatus and therefore carry the same identifying numerals.

In the FIG. 2 arrangement, the carriage 12 is moved radially relative to disk 16 by a carriage positioning apparatus shown generally at 52. Section 52 includes, in addition to a capstan 32 that is rotated incrementally in either direction by a stepping motor 36, a pair of idlers 54 and 58. The capstan and idlers are arranged in a triangle and idler 58 is biased away from the capstan and idler 54 by a pair of springs 64.

As in the FIG. 1 embodiment, a belt loop extends around the capstan and the idlers. In this case, however, the loop is comprised of two separate belt lengths, 66 and 68. These belt lengths have end segments 66a and 68a respectively wrapped in opposite directions appoximately 180 degrees around the capstan 32 at locations thereon spaced apart axially along the capstan. The end of segment 68a is secured to the capstan by a pin 72a, while the end of segment 68b is connected to the capstan by a pin 72b located directly below pin 72a.

Belt length 66 is trained around idler 54 and its opposite end segment 66b is wrapped approximately 180 degrees about idler 58 and secured to the periphery of the idler by a pin 76a. On the other hand, belt length 68 stretches from the capstan directly to idler 58 and its opposite end segment 68b is spaced axially along the idler from segment 66b and wrapped in the opposite direction about the idler being secured thereto by a pin 76b located directly below pin 76a. With the capstan in its illustrated reference position, the carriage 12 is secured to fixture 40 in the belt length 66 midway along the belt stretch between idler 54 and capstan 58 by a screw 42.

In this embodiment, also, the capstan 32 can be rotated incrementally in either direction from the illustrated reference position approximately 135 degrees for a total angular excursion of at least 270 degrees which corresponds to 154 steps of the carriage 12 along guide rods 14. Resultantly, the FIG. 2 carriage positioning apparatus also enables the transducer 10 to be positioned opposite 154 different tracks T on the disk 16. It is apparent from FIG. 2 that the edges of the belt stretches 66c, 66d, and 68 all lie in planes that are parallel to one another and also to the rods 14 along which carriage 12 is moved. When the capstan 32 is rotated, the two belt segments wrapped around the capstan and the two belt portions wrapped around idler 58 remain parallel to one another so that there is no overlap or interference between them that might limit the rotation of the capstan or change the effective radius of the capstan or idler which change might vary the advance of the transducer upon successive steps of the motor.

It will be appreciated also that in the FIG. 2 embodiment of the invention, the carriage 12 can be connected to any of the three belt stretches as long as that stretch is oriented generally parallel to the guide rods 14. Further, the belt segments engaged around the idler and capstan 10 may be wrapped in the opposite directions from those illustrated. The only requirement is that as one segment is wound on the capstan or idler, the other segment is unwound therefrom.

It is apparent from the foregoing then, that a stepping motor having a given number of steps per revolution incorporated into our positioning apparatus can position a transducer opposite a maximum number of tracks on a recording medium. Furthermore, this can be accomplished even though the motor is operated in a full step mode so that there is no appreciable loss of positional accuracy. Also, the apparatus can employ a capstan and idlers having relatively small diameters and therefore small rotational inertias so that the overall positioning apparatus has a relatively fast response. Finally, all of these advantages are gained without materially increasing the cost or complexity of the apparatus as compared with prior comparable arrangements of this general type. Therefore the cost of obtaining and maintaining it are kept to a minimum.

It will thus be seen that the objects set forth above, among those made apparent from the preceding description are efficiently attained, and since certain changes may be made in the above constructions, without departing from the scope of the invention, it is intended that all matter contained in the above description or shown in the accompany drawing be interpreted as illustrative and not in a limiting sense.

It is also to be understood that the following claims are intended to cover all of the generic and specific features of the invention herein described.

We claim:

1. Transducer positioning apparatus comprising
   A. means defining a track,
   B. a carriage,
   C. a rotatable capstan,
   D. a motor for rotating the capstan in either direction about its axis,
   E. flexible belting, said belting having end segments wrapped around said capstan from opposite directions at axially spaced locations on the capstan,
   F. means for securing the ends of said segments to the capstan, the amount of wrap of said belting segments being such that when either segment unwinds from the capstan as the capstan is rotated until its securing means approaches the point of departure of that segment from the capstan, the other segment does not wind up on the capstan to the extent that it wraps upon itself, G. one or more idlers around which the belting is trained to form a belting loop having two or more stretches, one of said stretches extending generally parallel to said track, said idlers and belting being arranged and adapted so that when the capstan is rotated, the belting segments wrapped thereon remain parallel to one another, and H. means for connecting the carriage to the belting intermediate the ends of said one belting stretch.

2. The apparatus defined in claim 1 wherein the motor is a stepping motor.

3. The apparatus defined in claim 1 wherein the belting segments are wrapped around the capstan approximately 90 to 180 degrees when the carriage is positioned midway along said one belting stretch.

4. The apparatus defined in claim 1 wherein the capstan and at least one idler are biased relatively away from one another to tension the loop.

5. The apparatus defined in claim 1 wherein the connecting means includes

A. a fixture secured to the belting, said fixture applying a lengthwise twist to the belting along the length of the fixture, and B. means for securing the fixture to the carriage.

6. The apparatus defined in claim 1 wherein

A. there is one idler forming the belting loop with two belting stretches extending between the idler and the capstan, one of said stretches extending generally parallel to said track and being connected to the carriage, and B. the capstan and the idler are cocked relative to one another so that the two belting segments wrapped about the capstan remain parallel to said one belting stretch as the capstan is rotated.

7. The apparatus defined in claim 6 wherein the two belting segments are wrapped approximately 90 to 180 degrees around the capstan when the carriage is located midway between the capstan and the idler.

8. The apparatus defined in claim 7 and further including means for biasing the capstan and idler away from one another to tension the loop.

9. The apparatus defined in claim 1 wherein

A. there are two idlers arranged with the capstan in a triangle forming a belting loop having three belting stretches, one of said stretches extending generally parallel to said track and being connected to the carriage, and B. the belting loop comprises at least two separate belt lengths, one length extending from the capstan around one idler and wrapping in one direction around the second idler, the second belt length extending from the capstan and wrapping in the opposite direction around the second idler at a location thereon spaced axially from the first belt length, the amount of wrap of the belt lengths around the second idler being substantially the same as the amount of wrap of said belting segments around said capstan.

10. The apparatus defined in claim 9 wherein the two belting segments are wrapped around the capstan approximately 90 to 180 degrees when the carriage is positioned midway along the belting stretch to which it is connected.

11. The apparatus defined in claim 10 and further including means for biasing at least one of the capstan and idlers relatively away from the others to tension the belting loop.

* * * * *